United States Patent
Narayanan et al.

(10) Patent No.: US 8,606,967 B2
(45) Date of Patent: Dec. 10, 2013

(54) METHODS AND APPARATUS FOR PROXYING OF DEVICES AND SERVICES USING OVERLAY NETWORKS

(75) Inventors: Vidya Narayanan, San Diego, CA (US); Ranjith S. Jayaram, Bridgewater, NJ (US); Lakshminath R. Dondeti, Hyderabad (IN); Edward T. L. Hardie, Menlo Park, CA (US); Noam A. Ziv, Solana Beach, CA (US); Ramachandran Subramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 944 days.

(21) Appl. No.: 12/485,538

(22) Filed: Jun. 16, 2009

(65) Prior Publication Data

US 2009/0313290 A1    Dec. 17, 2009

Related U.S. Application Data

(60) Provisional application No. 61/073,213, filed on Jun. 17, 2008, provisional application No. 61/143,704, filed on Jan. 9, 2009.

(51) Int. Cl.
*G06F 13/00* (2006.01)

(52) U.S. Cl.
USPC ............ 709/249; 709/202; 709/213; 709/220

(58) Field of Classification Search
USPC ......... 709/201, 202, 213, 214, 215, 217, 219, 709/223, 225, 250
See application file for complete search history.

(56) References Cited

U.S. PATENT DOCUMENTS

| | | | |
|---|---|---|---|
| 8,095,500 B2* | 1/2012 | Rose et al. ............... | 707/609 |
| 2004/0066770 A1 | 4/2004 | Pabla et al. | |

(Continued)

FOREIGN PATENT DOCUMENTS

| | | |
|---|---|---|
| CN | 1517900 A | 8/2004 |
| CN | 1988449 A | 6/2007 |

(Continued)

OTHER PUBLICATIONS

Huang C., et al., "Network-aware P2P file sharing over the wireless mobile networks" IEEE Journal on Selected Areas in Communications, IEEE Service Center, Piscataway, US, vol. 25, No, 1, Jan. 1, 2007, pp. 204-210, XP011155859. ISSN: 0733-8716 figure 1 p. 2, right-hand column, line 4—line 5 p. 2, right-hand column, line 22—line 32 p. 3, right-hand column, line 11—line 2 2 p. 3, left-hand column, line 50—line 56 paragraph [IV. A].

(Continued)

*Primary Examiner* — Viet Vu
(74) *Attorney, Agent, or Firm* — Kristine U. Ekwueme

(57) ABSTRACT

Methods and apparatus for proxying of devices and services using overlay networks. A method for operating a proxy includes obtaining meta-data associated with at least one of a device and a service, generating a searchable index of the meta-data, and publishing the searchable index on the overlay network as at least one of a distributed index and a centralized index. Another method includes receiving a request from a device or a service using a non overlay protocol to receive at least one of data and services from the overlay network, searching an index of meta-data on the overlay network based on the request, identifying a node associated with the at least one of data and services based on the index, establishing a direct connection with the node, and obtaining the at least one of data and services using the direct connection.

48 Claims, 5 Drawing Sheets

(56) References Cited

U.S. PATENT DOCUMENTS

| | | | |
|---|---|---|---|
| 2004/0148434 | A1 | 7/2004 | Matsubara et al. |
| 2007/0250590 | A1* | 10/2007 | Flannery et al. .............. 709/217 |
| 2007/0266169 | A1* | 11/2007 | Chen et al. ................... 709/231 |

FOREIGN PATENT DOCUMENTS

| | | |
|---|---|---|
| JP | 2001290794 A | 10/2001 |
| JP | 2003273937 A | 9/2003 |
| JP | 2004227562 A | 8/2004 |
| JP | 2008011147 A | 1/2008 |
| TW | I245515 B | 12/2005 |
| TW | 200642353 | 12/2006 |
| WO | I249922 B | 2/2006 |

OTHER PUBLICATIONS

International Search Report and Written Opinion—PCT/US2009/047708—ISA/EPO—Oct. 13, 2009.

Isomura M., "Proposal of Integrated Communication Platform for Sensor Networks," DVD-ROM of Proceedings of Multimedia, Distributed, Cooperative and Mobile (DICOMO) Symposiums of 1997-2006, Ver. 1.1, Japan, The Information Processing Society of Japan, Aug. 31, 2008, vol. 2008, No. 8, pp. 89-92.

Matthews C., P., et al., "The Effect of NATs on P2PSIP Overlay Architecture; draft-matthews-p2psi p-nats-and-overlays-01.txtf" IETF Standard-Working-Draft, Internet Engineering Task Force, IETF, CH, No. 1, Mar. 4, 2007, XP015050191 ISSN: 0000-0004 figure 2 paragraphs [0001], [0003].

Taiwan Search Report—TW098120321—TIPO—Oct. 15, 2012.

Bryan, et al: "Concepts and Terminology for Peer to Peer SIP"; Cisco Systems; P2PSIP Working Group; Internet-Draft; Mar. 4, 2007.

Gupta, et al: "Efficient Routing for Peer-to-Peer Overlays"; MIT Computer Science and Artificial Intelligence Laboratory; csail.mit.edu.

Guha, et al: "NAT Behavioral Requirements for TCP draft-ietf-behave-tcp-7.txt"; Cisco Systems; Network Working Group; Internet-Draft; Oct. 30, 2007.

Cheshire, et al: "DNS-Based Service Discovery"; Apple Inc.; Internet-Draft; Sep. 10, 2008.

Cheshire, et al: "Multicast DNS"; Apple Inc.; Internet-Draft, Sep. 10, 2008.

Rosenberg, J.; "Interactive Connectivity Establishment (ICE): A Protocol for Network Address Translator (NAT) Traversal for Offer/Answer Protocols"; Cisco Systems; Internet-Draft; Oct. 29, 2007.

Rosenberg, J.; "TCP Candidates with Interactive Connectivity Establishment (ICE)"; Cisco Systems; Internet-Draft; Feb. 25, 2008.

Rosenberg, J.: "NICE: Non Session Initiation Protocol (SIP) Usage of Interactive Connectivity Establishment (ICE)"; Cisco Systems; Internet-Draft; Feb. 15, 2008.

Rosenberg, et al: "Session Traversal Utilities for (NAT) (STUN)"; Cisco Systems; Internet-Draft; Feb. 23, 2008.

Rosenberg, et al: "Traversal Using Relays Around NAT (TURN): Relay Extensions to Session Traversal Utilities for NAT (STUN)"; Cisco Systems; Internet-Draft; Feb. 25, 2008.

* cited by examiner

METHODS AND APPARATUS FOR PROXYING OF DEVICES AND SERVICES USING OVERLAY NETWORKS

CLAIM OF PRIORITY UNDER 35 U.S.C. §119

The present Application for Patent claims priority to Provisional Application No. 61/073,213 entitled "Methods and Apparatus for Interworking between IP Overlay Networks and non-IP Devices" filed Jun. 17, 2008, and assigned to the assignee hereof and hereby expressly incorporated by reference herein.

The present Application for Patent claims priority to Provisional Application No. 61/143,704 entitled "Proxying in Peer-to-Peer Networks" filed Jan. 9, 2009, and assigned to the assignee hereof and hereby expressly incorporated by reference herein.

BACKGROUND

1. Field

The present application relates generally to the operation of overlay networks, and more particularly, to methods and apparatus for proxying devices and services using overlay networks.

2. Background

A network in which member nodes obtain services in the absence of server-based infrastructure is referred to as a "peer-to-peer" overlay network. In a peer-to-peer overlay, peer nodes co-operate with each other both to provide services and to maintain the network. Peer-to-peer overlay networks can be built on top of an underlying network, such as a network utilizing the Internet Protocol (IP).

Typically, the nodes of a peer-to-peer overlay network differ from one another in capabilities and each node's capabilities may vary with time. For example, the amount of permanent storage available at a node may vary as files are stored and deleted by a file storage device. In another example, the battery level at a node falls over time while the node is disconnected from a main power source.

Consider a node that cannot participate in a peer-to-peer overlay network because it does not support the protocol used on the overlay. It is still possible for the node (i.e., device) to provide services to and receive services from the peer-to-peer overlay network in a limited fashion by designating another node in the overlay network as a proxy. The proxy node responds to the other nodes of the overlay network on behalf of the proxied node. Thus, as far as the rest of the nodes of the overlay network are concerned, it is as though the proxy node is providing the services of the proxied node.

Generally, a node may communicate with its proxy using a non overlay protocol that is not compatible with the protocol used on the overlay network. The proxy operates to forward packets from the proxied node to another proxy on the overlay, which in turns forwards those packets to a node that utilizes the same non overlay protocol. Thus, in conventional systems, proxies operate to allow nodes that utilize the same non overlay protocol to communicate through the overlay network. Unfortunately, current systems do not allow communications between nodes or devices that utilize different non-overlay protocols.

Therefore, it is desirable to have a simple cost effective mechanism that operates to allow proxying of devices and services on a peer-to-peer overlay network regardless of the non overlay protocols used by the devices or services.

SUMMARY

A proxy system, comprising methods and apparatus, is provided that operates to allow proxying of devices and services on a peer-to-peer overlay network regardless of the non overlay protocols used by the devices and services.

In an aspect, a method is provided for operating a proxy in a peer-to-peer overlay network. The method comprises obtaining meta-data associated with at least one of a device and a service, generating a searchable index of the meta-data, and publishing the searchable index on the overlay network as at least one of a distributed index and a centralized index.

In an aspect, an apparatus is provided for proxying in a peer-to-peer overlay network. The apparatus comprises means for obtaining meta-data associated with at least one of a device and a service, means for generating a searchable index of the meta-data, and means for publishing the searchable index on the overlay network as at least one of a distributed index and a centralized index.

In an aspect, an apparatus is provided for proxying in a peer-to-peer overlay network. The apparatus comprises a processor configured to obtain meta-data associated with at least one of a device and a service and generate a searchable index of the meta-data, and a transceiver configured to publish the searchable index on the overlay network as at least one of a distributed index and a centralized index.

In an aspect, a computer program product is provided for proxying in a peer-to-peer overlay network. The computer program product comprises a computer-readable medium embodying codes executable to obtain meta-data associated with at least one of a device and a service, generate a searchable index of the meta-data, and publish the searchable index on the overlay network as at least one of a distributed index and a centralized index.

In an aspect, a method is provided for operating a proxy in a peer-to-peer overlay network. The method comprises receiving a request from at least one of a device and a service using a non overlay protocol to receive at least one of data and services from the overlay network, searching an index of meta-data on the overlay network based on the request, wherein the index is at least one of a distributed index and a centralized index, and identifying a node associated with the at least one of data and services based on the index. The method also comprises establishing a direct connection with the node and obtaining the at least one of data and services using the direct connection.

In an aspect, an apparatus for proxying a device in a peer-to-peer overlay network. The apparatus comprises means for receiving a request from at least one of a device and a service using a non overlay protocol to receive at least one of data and services from the overlay network, means for searching an index of meta-data on the overlay network based on the request, wherein the index is at least one of a distributed index and a centralized index, and means for identifying a node associated with the at least one of data and services based on the index. The apparatus also comprises means for establishing a direct connection with the node and means for obtaining the at least one of data and services using the direct connection.

In an aspect, an apparatus is provided for proxying a device in a peer-to-peer overlay network. The apparatus comprises a transceiver configured to receive a request from at least one of a device and a service using a non overlay protocol to receive at least one of data and services from the overlay network. The apparatus also comprises a processor configured to search an index of meta-data on the overlay network based on the request, wherein the index is at least one of a distributed index and a centralized index, identify a node associated with the at least one of data and services based on the index, establish a direct connection with the node, and obtain the at least one of data and services using the direct connection.

In an aspect, a computer program product is provided for proxying a device in a peer-to-peer overlay network. The computer program product comprises a computer-readable medium embodying codes executable to receive a request from at least one of a device and a service using a non overlay protocol to receive at least one of data and services from the overlay network, search an index of meta-data on the overlay network based on the request, wherein the index is at least one of a distributed index and a centralized index, identify a node associated with the at least one of data and services based on the distributed index, establish a direct connection with the node, and obtain the at least one of data and services using the direct connection.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following Description when taken in conjunction with the accompanying drawings wherein.

DESCRIPTION

The following description describes aspects of a proxy system that operates to allow proxying of devices and services on a peer-to-peer overlay network regardless of the non overlay protocols used by the devices and services.

Figure 1:
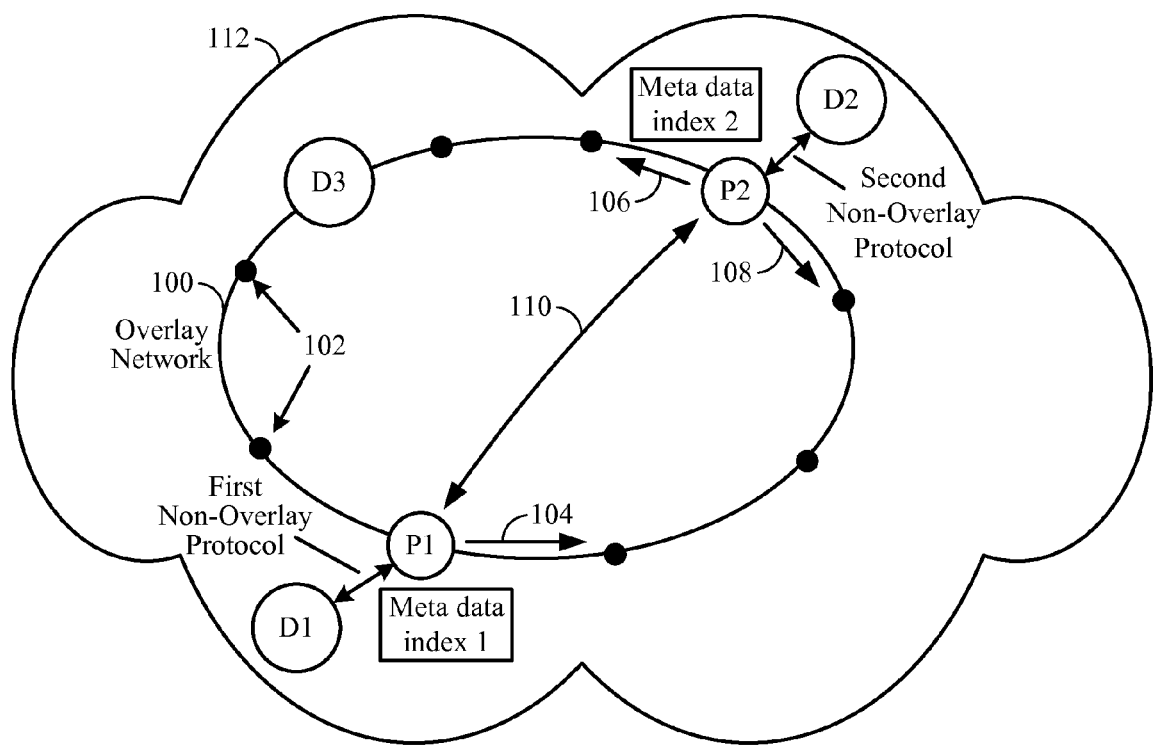
FIG. 1 shows an network that illustrates aspects of a proxy system.

FIG. 1 shows a peer-to-peer overlay network 100 that illustrates aspects of a proxy system. The overlay network 100 utilizes the infrastructure of an underlying network 112, such as an Internet Protocol network, to allow a subset of nodes 102 of the underlying network to participate in the overlay network 100. The underlying network 112 may comprise any number or types of networks such as WANs, LANs, wireless networks or any other type of IP network. In an aspect, the overlay network 100 is a distributed hash table (DHT) overlay network; however, the proxy system is suitable for use with other types of overlay networks.

The overlay network 100 comprises a first proxy (P1) that is operable to communicate on the overlay network 100 using an overlay protocol. A device (D1) is coupled to a first proxy (P1) and communicates with the first proxy using a first non-overlay protocol. For example, the device D1 may be an IP protocol device such as a multimedia music/video player or a device that uses the Universal Plug and Play (UPnP) protocol. The overlay network 100 also comprises a second proxy (P2) that is operable to communicate on the overlay network 100 using the overlay protocol. A device (D2) is coupled to a second proxy (P2) and communicates with the second proxy using a second non-overlay protocol. For example, the device D2 may be a non IP protocol device, such as a Bluetooth or Universal Serial Bus (USB) device. The overlay network 100 also comprises a third device (D3) that communicates on the overlay network using the overlay protocol. The device D3 may be an IP device that also operates on the overlay network 100 as a routing node. It should also be noted that the proxy system is applicable to proxy both devices and services. For example, the proxy P1 may also proxy services onto the overlay network 100. In one implementation, the services are collocated with a proxy P1 and the various aspects of the proxy system described below may be applied with little or no modification to cover this configuration or topology.

Generation of Meta-Data Index

During operation of the proxy system, the proxies P1 and P2 operate to generate a searchable index of meta-data associated with their respective proxied devices. For example, the proxy P1 operates to generate meta-data index 1 that characterizes the information about the device D1 and the services it offers. Similarly, the proxy P2 operates to generate meta-data index 2 that characterizes the information about the device D2 and the services it offers. Thus, each meta-data index describes the data and/or services available from the associated device. In an aspect, the proxies P1 and P2 initiate communications with their respective devices (D1 and D2) using the appropriate non overlay protocol to obtain the meta-data. In another aspect, each device operates on its own to transmit or otherwise communicate its meta-data to it respective proxy using the appropriate non overlay protocol. For example, each proxy (P1, P2) listens to advertisements from their respective proxied devices D1 and D2 to obtain the meta-data.

Publication of Meta-data Indexes

After the meta-data indexes are generated, the proxies P1 and P2 operate to publish the meta-data indexes on the overlay network as shown at 104 and 106. For example, the meta-data indexes are published as distributed indexes so that portions of the indexes are maintained at one or more nodes on the overlay network 100. In another aspect, the meta-data indexes are published at a particular location on the overlay network as a centralized index. The published indexes allow the meta-data to be searched by other nodes on the overlay network. For example, the device D3 can perform a search of the published index to determine where desired data can be found on the overlay network.

Searching the Index

After the meta-data indexes are published, any node on the overlay network 100 can search the indexes to find desired data or services. For example, the device D2 sends a request to the proxy P2 to conduct a search for data, a particular file or a particular service. The request is sent using the second non overlay protocol. The proxy P2 communicates on the overlay network 100 using the overlay network protocol to conduct a search of the published meta-data index to look for the location of the desired data or service. It will be assumed for this example that the search indicates that the desired data or service can be found at device D1. The proxy P2 communicates this information to the device D2 using the second non overlay protocol.

Establish Connection to Obtain Data

After the device D2 is informed of the location of the data or service on the overlay network, the device D2 communicates with the proxy P2 using the second non overlay protocol to request to obtain the data or service from device D1. The proxy P2 uses the overlay protocol to issue a request 108 to establish a communication channel with the device D1. The request is routed on the overlay network (i.e., hop to hop) until it reaches the proxy P1. After some negotiation between proxy P1 and P2, the services of the underlying network (in this example, the IP network) are used to establish a direct communications channel 110 between the two proxies.

Translating Data

Once the communications channel 110 is established, the proxies P1 and P2 communicate with the device D1 and D2 using the appropriate non overlay protocols. A request for a selected data file or service is processed by the device D1 and the data or service is provided to the device D2 utilizing the communications channel 110 and the services of the proxies P1 and P2 to translate between the first and second non overlay protocols and the overlay protocols. Aspects of this translation include, but are not limited to translation of data formats, modification of IP addresses, and taking steps to ensure uniqueness of service and data identifiers.

In another aspect, the device D3 operates on the overlay network 100 using the overlay protocol. The device D3 searches the indexes in a fashion similar to the proxies P1 and P2 to discover the location of data or services provided by devices proxied onto the overlay network 100. The device D3 can then issue requests for data or services, which are routed on the overlay network to the appropriate proxy. A direct communication channel may then be established between the device D3 and the appropriate proxy to facilitate the access of the desired data or service.

Thus, the proxy system operates to provide an efficient mechanism for proxying different devices on a peer-to-peer overlay network regardless of the non overlay protocols used by the devices.

Figure 2:
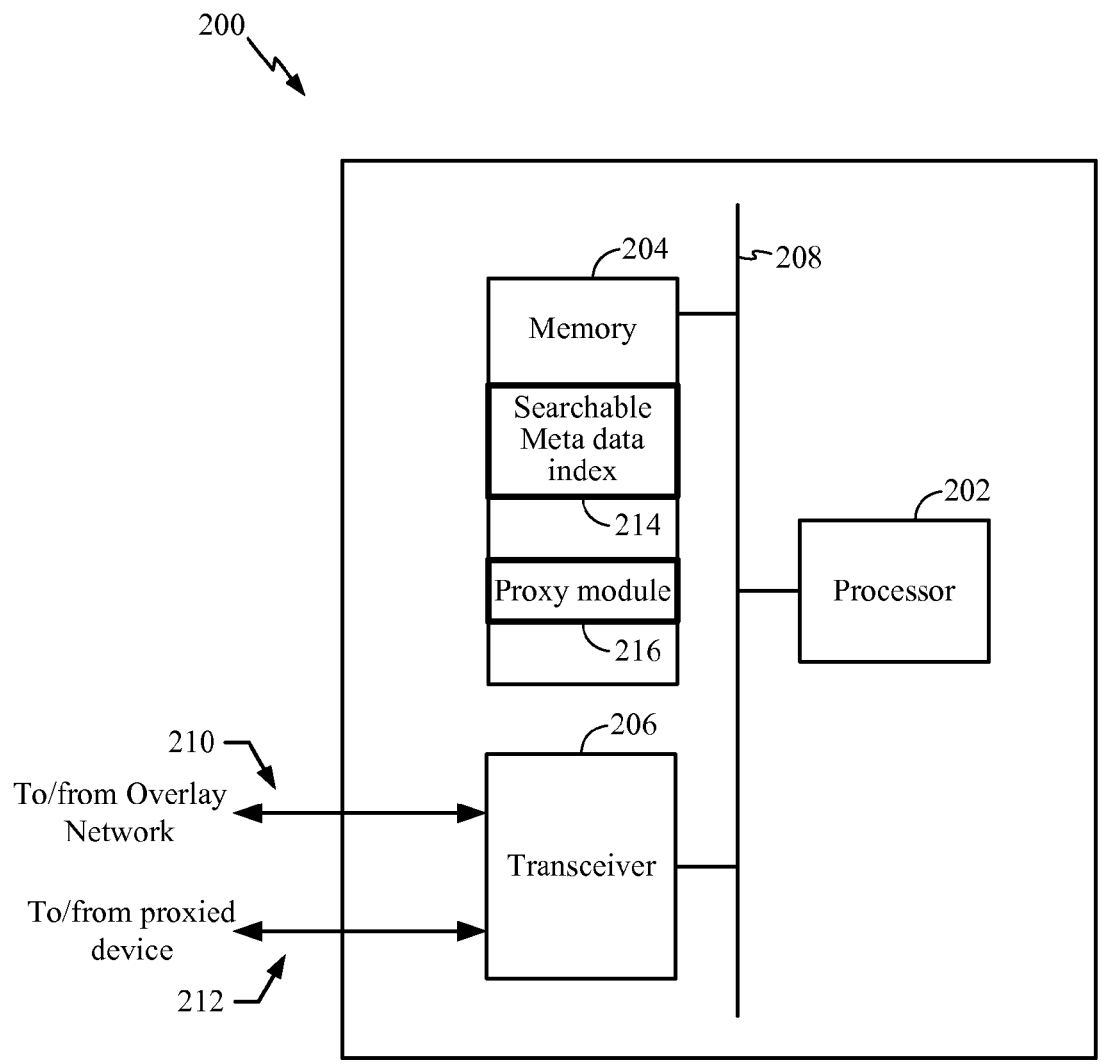
FIG. 2 shows a proxy for use in aspects of a proxy system.

FIG. 2 shows a proxy 200 for use in aspects of a proxy system. For example, the proxy 200 is suitable for use as the proxy P1 or the proxy P2 shown in FIG. 1. The proxy 200 comprises processor 202, memory 204, and transceiver 206 all coupled to a data bus 208. It should be noted that the proxy 200 is just one implementation and that other implementations are possible.

The transceiver 206 comprises hardware and/or hardware executing software that operates to allow the proxy 200 to communicate data or other information with a plurality of nodes on a peer-to-peer overlay network utilizing an overlay protocol. For example, the transceiver 206 communicates with nodes on an overlay network using the communication link 210. The transceiver 206 is also operable to use the communication link 210 to establish a direct communication link with another node or device on an overlay network. For example, the direct communication link may be a TCP or UDP connection supported by an underlying IP network infrastructure.

The transceiver 206 also operates to allow the proxy 200 to communicate with one or more devices utilizing a non-overlay protocol. For example, the transceiver 206 communicates with an IP or non IP device using a non overlay protocol and the communication link 212. In an aspect, the devices comprise, but are not limited to multimedia devices, Bluetooth devices, USB devices and any other types of IP or non IP devices.

The memory module 204 comprises any suitable storage device operable to store indexed meta-data 214 associated with one or more devices and associated data or services. For example, the meta-data comprises but is not limited to, device descriptors, data descriptors, title, author, duration, data rate, genre, bandwidth or any other type of information.

The memory 204 is also operable to store proxy module 216 that comprises one or more modules embodying instructions or codes executable by the processor 202 to perform the functions of the proxy system described herein.

In one or more aspects, the processor 202 comprises at least one of a CPU, processor, gate array, hardware logic, memory elements, and/or hardware executing software. In an aspect, the processor 202 operates execute codes of the proxy module 216 to control the proxy 200 to proxy one or more devices on an overlay network by performing the functions described above. A more detailed description of the operation of the proxy 200 is provided in another section of this document.

In an aspect, the proxy system comprises a computer program product having one or more program instructions ("instructions") or sets of "codes" stored or embodied on a machine-readable medium. When the codes are executed by at least one processor, for instance, the processor 202, their execution causes the proxy 200 to provide the functions of the proxy system described herein. For example, the machine-readable medium comprises a floppy disk, CDROM, memory card, FLASH memory device, RAM, ROM, optical disk or any other type of memory device or machine-readable medium that interfaces to the proxy 200. The sets of codes, when executed, operate to provide aspects of a proxy system as described herein.

Figure 3:
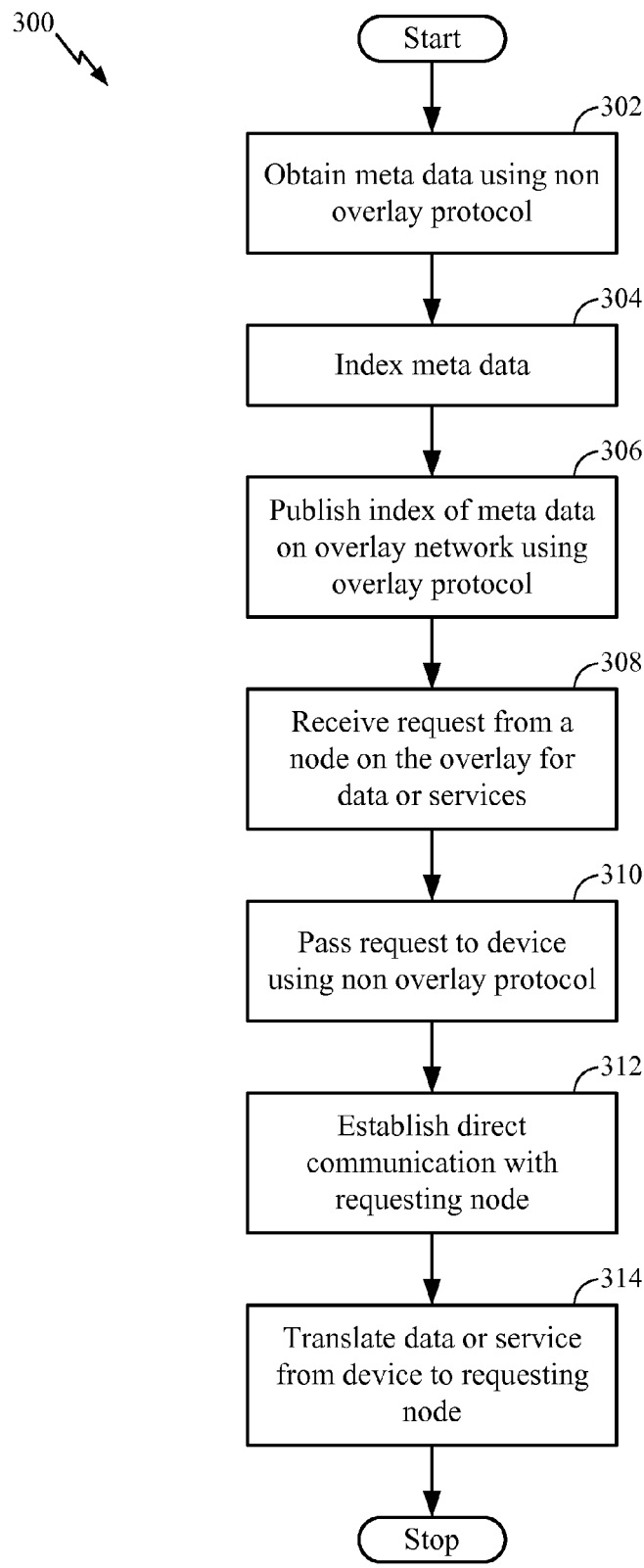
FIG. 3 shows an exemplary method for operating a proxy in aspects of a proxy system.

FIG. 3 shows an exemplary method 300 for operating a proxy to provide aspects of a proxy system. For clarity, the method 300 is described below with reference to the proxy 200 shown in FIG. 2. In an aspect, the processor 202 executes one or more sets of codes of the proxy module 216 to control the proxy 200 to perform the functions described below.

At block 302, meta-data is obtained from a device to be proxied on an overlay network. For example, the processor 202 communicates with the device through the transceiver 206 and communication link 212 using a non overlay protocol supported by the device. The device provides information about the types of data or services that it provides or supports. In an aspect, the processor 202 operates to request the meta-data information from the device using the non overlay protocol supported by the device. In another aspect, the device advertises or otherwise transmits the meta-data information to the proxy 200 without the need for a special request.

At block 304, the meta-data is indexed. Indexing is the process by which data is collected, parsed, and stored in a manner that facilitates fast and accurate retrieval of information. In an aspect, the processor 202 generates a searchable index of meta-data 214 and stores it in the memory 204.

At block 306, the searchable index of meta-data is published on an overlay network. For example, the processor 202 publishes the searchable index of meta-data 214 on an overlay network using the transceiver 206 and communication link 210. In one implementation, the index of meta-data is published as a distributed index so that various nodes on the overlay network maintain one or more portions of the index and all nodes on the overlay network may easily search the index. In another implementation, the index of meta-data is published as a centralized index so that all nodes on the overlay network may easily search the index at a particular location on the overlay network.

At block 308, a request is received to obtain data or services. For example, a node on the overlay network has searched the distributed meta-data index and determined that the proxied device has data the node desires to receive. The node then transmits a request on the overlay to obtain the data or service. The request is routed on the overlay network to the proxy supporting the device. In this case, the request is received by the proxy 200 using the communication link 210.

At block 310, the request for data or services is passed to the proxied device using the non overlay protocol supported by the device. For example, the request is transmitted on the link 212 to the proxied device using the appropriate non overlay protocol.

At block 312, the device agrees to provide the requested data or service and requests the proxy to establish a direct communications link with the requesting node. For example, a direct connection is established between the proxy 200 and a node on the overlay network or other proxy on the overlay network. In an aspect, the underlying network infrastructure is used to establish the direct connection.

At block 314, the requested data or service is transmitted from the device to the proxy using the non overlay protocol supported by the device. The proxy then translates the data for transmission on the overlay network and transmits the data or service directly to the requesting node using the direct communication link. For example, the proxy 200 receives the data from a proxied device using the communication link 212 and the appropriate non overlay protocol. The proxy 200 then translates and transmits the data on the overlay network using the communication link 210. For example, the processor 202 performs translation of data and services to provide appropriate data formats, modification of IP addresses, and uniqueness of service and data identifiers.

Therefore, the method 300 is operable at a proxy to provide aspects of a proxy system. It should be noted that the method 300 is just one implementation and that the operations of the method 300 may be rearranged or otherwise modified within the scope of the various aspects. Thus, other implementations are possible.

Figure 4:
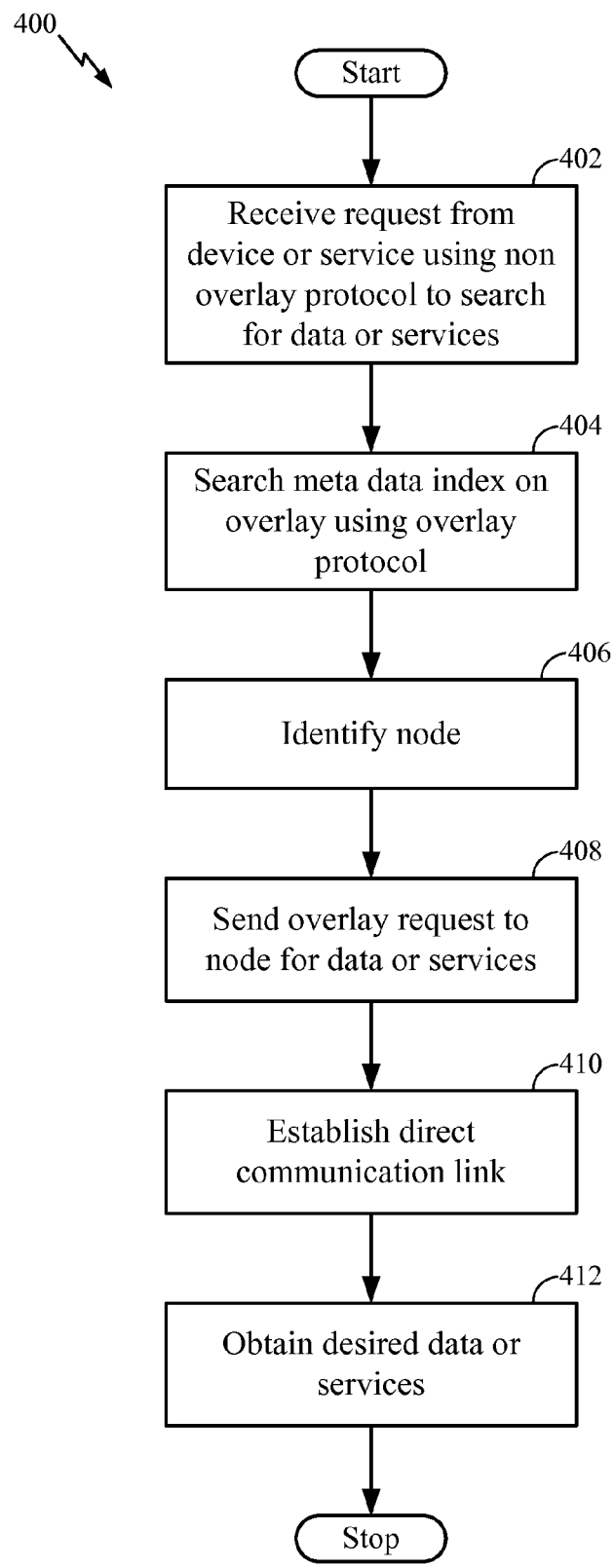
FIG. 4 shows an exemplary method for operating a proxy in aspects of a proxy system.

FIG. 4 shows an exemplary method 400 for operating a proxy for use in aspects of a proxy system. For clarity, the method 400 is described below with reference to the proxy 200 shown in FIG. 2. In an aspect, the processor 202 executes one or more sets of codes of the proxy module 216 to control the proxy 200 to perform the functions described below.

At block 402, a request from a device or a service to search for data or services on an overlay network is received using a non overlay protocol. For example, the device D2 sends the request to the proxy P2 using the second non overlay protocol. The request is received by the transceiver 206 over the communication link 212 and passed to the processor 202.

At block 404, in response to the request, an index on an overlay network is searched using an overlay protocol. For example, the proxy P2 searches the index on the overlay network using the overlay protocol. In an aspect, the processor 202 controls the transceiver 206 to search the index on the overlay network using the communication link 210. In an aspect, the index is at least one of a distributed index and a centralized index.

At block 406, a node is identified where the desired data or services can be found on the overlay network. In an aspect, the processor 202 determines from the search that the device D1 can provide the requested data or services. The device D1 is accessible through the proxy P1. In another aspect, requested data or service appears to be on P1 and not on D1. That is, P1 can hide the fact that the data or service is on D1.

At block 408, an overlay request for the desired data or services is sent from the proxy P2 and routed through the overlay network to the proxy P1. In an aspect, the processor 202 sends the overlay request through the transceiver 206 and the communication link 210 utilizing the overlay protocol.

At block 410, in response to the request, a direct communications link is established between the proxy P2 and the proxy P1. For example, the processor 202 and the transceiver 206 use the communication link 210 and the overlay protocol to negotiate a direct connection using the services of the underlying network infrastructure.

At block 412, the desired data or services is obtained by the proxy P2 and passed to the device D2. For example, the data is received over the direct communication link 210 by the transceiver 206 and passed to the processor 202. The processor 202 translates the data or services and transmits them to the device D2 through the transceiver 206 and the communication link 212 using the non overlay protocol.

Therefore, the method 400 is operable at a proxy to provide aspects of a proxy system. It should be noted that the method 400 is just one implementation and that the operations of the method 400 may be rearranged or otherwise modified within the scope of the various aspects. Thus, other implementations are possible.

Figure 5:
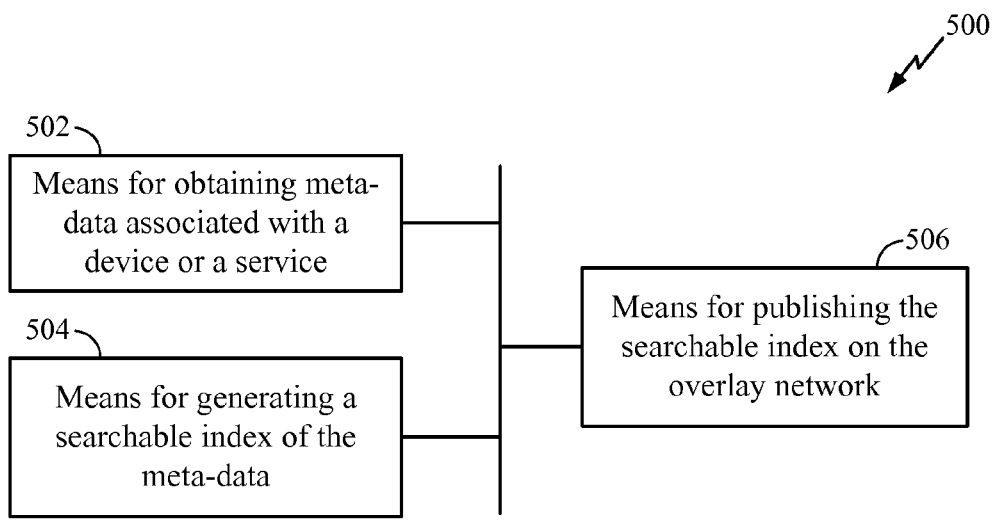
FIG. 5 shows a proxy for use in aspects of a proxy system.

FIG. 5 shows an exemplary proxy 500 for use in aspects of a proxy system. For example, the proxy 500 is suitable for use as the proxy 200 shown in FIG. 2. In an aspect, the proxy 500 is implemented by at least one integrated circuit comprising one or more modules configured to provide aspects of a peer-to-peer overlay network proxy system as described herein. For example, in an aspect, each module comprises hardware and/or hardware executing software.

The proxy 500 comprises a first module comprising means (502) for obtaining meta-data associated with a device or a service, which in an aspect comprises the processor 202. The proxy 500 also comprises a second module comprising means (504) for generating a searchable index of the meta-data, which in an aspect comprises the processor 202. The proxy 500 also comprises a third module comprising means (506) for publishing the searchable index on the overlay network as at least one of a distributed index and a centralized index, which in an aspect comprises the transceiver 206.

Figure 6:
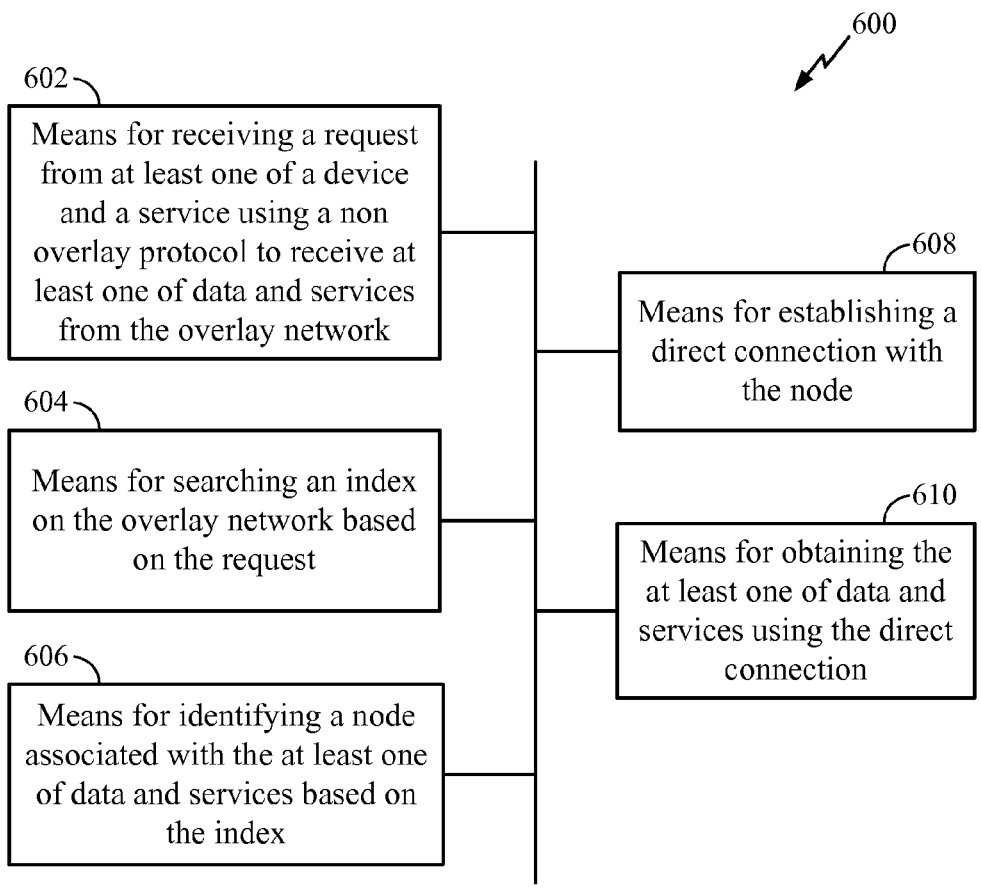
FIG. 6 shows a proxy for use in aspects of a proxy system.

FIG. 6 shows an exemplary proxy 600 for use in aspects of a proxy system. For example, the proxy 600 is suitable for use as the proxy 200 shown in FIG. 2. In an aspect, the proxy 600 is implemented by at least one integrated circuit comprising one or more modules configured to provide aspects of a peer-to-peer overlay network proxy system as described herein. For example, in an aspect, each module comprises hardware and/or hardware executing software.

The proxy 600 comprises a first module comprising means (602) for receiving a request from at least one of a device and a service using a non overlay protocol to receive at least one of data and services from the overlay network, which in an aspect comprises the transceiver 206. The proxy 600 also comprises a second module comprising means (604) for searching an index of meta-data on the overlay network based on the request, wherein the index is at least one of a distributed index and a centralized index, which in an aspect comprises the processor 202. The proxy 600 also comprises a third module comprising means (606) for identifying a node associated with the at least one of data and services based on the index, which in an aspect comprises the processor 202. The proxy 600 also comprises a fourth module comprising means (608) for establishing a direct connection with the node, which in an aspect comprises the processor 202. The proxy 600 also comprises a fifth module comprising means (610) for obtaining the at least one of data and services using the direct connection, which in an aspect comprises the processor 202.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a wireless communication device. In the alternative, the processor and the storage medium may reside as discrete components in a wireless communication device.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a proxy system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for operating a proxy in a peer-to-peer overlay network, the method comprising:
    obtaining meta-data associated with at least one of a device and a service, wherein said obtaining comprises obtaining the meta-data from the device using an appropriate first non overlay protocol such that the appropriate first non overlay protocol is dependent on the device;
    generating a searchable index of the meta-data;
    publishing the searchable index on the overlay network as at least one of a distributed index and a centralized index;
    communicating with a second proxy in the peer-to-peer overlay network; and
    transmitting meta-data associated with the device and the service to a second device or second service via the second proxy over an appropriate second non-overlay protocol, wherein the appropriate second non overlay protocol is dependent on the second device.

2. The method of claim 1, wherein said obtaining comprises querying the device to obtain the meta-data.

3. The method of claim 1, wherein said obtaining comprises listening to advertisements from the device to obtain the meta-data.

4. The method of claim 1, further comprising receiving a request from a node to obtain data or services from the device, wherein the request is received through the overlay network.

5. The method of claim 4, further comprising:
    establishing a direct connection with the node;
    establishing a connection with a selected device proxied by the node; and
    providing the data or service to the node using the direct connection.

6. The method of claim 5, wherein said providing comprises translating selected data elements of the data.

7. The method of claim 6, wherein the selected device is one of an IP device and a non IP device.

8. The method of claim 1, wherein the device is one of an IP device and a non IP device.

9. An apparatus for operating a proxy in a peer-to-peer overlay network, the apparatus comprising:
    means for obtaining meta-data associated with at least one of a device and a service, wherein said means for obtaining comprises means for obtaining the meta-data from the device using an appropriate first non overlay protocol such that the appropriate first non overlay protocol is dependent on the device;
    means for generating a searchable index of the meta-data;
    means for publishing the searchable index on the overlay network as at least one of a distributed index and a centralized index;
    means for communicating with a second proxy in the peer-to-peer overlay network; and
    means for transmitting meta-data associated with the device and the service to a second device or second service via the second proxy over an appropriate second non-overlay protocol, wherein the appropriate second non overlay protocol is dependent on the second device.

10. The apparatus of claim 9, wherein said means for obtaining comprises means for querying the device to obtain the meta-data.

11. The apparatus of claim 9, wherein said means for obtaining comprises means for listening to advertisements from the device to obtain the meta-data.

12. The apparatus of claim 9, further comprising means for receiving a request from a node to obtain data or services from the device, wherein the request is received through the overlay network.

13. The apparatus of claim 9, further comprising:
    means for establishing a direct connection with the node;
    means for establishing a connection with a selected device proxied by the node; and
    means for providing the data or service to the node using the direct connection.

14. The apparatus of claim 13, wherein said means for providing comprises translating selected data elements of the data.

15. The apparatus of claim 14, wherein the selected device is one of an IP device and a non IP device.

16. The apparatus of claim 9, wherein the device is one of an IP device and a non IP device.

17. An apparatus for operating a proxy in a peer-to-peer overlay network, the apparatus comprising:
    a processor configured to obtain meta-data associated with at least one of a device and a service and generate a searchable index of the meta-data, wherein said processor is configured to obtain the meta-data from the device using an appropriate first non overlay protocol such that the appropriate first non overlay protocol is dependent on the device; and
    a transceiver configured to publish the searchable index on the overlay network as at least one of a distributed index and a centralized index, communicate with a second proxy in the peer-to-peer overlay network, and transmit meta-data associated with the device and the service to a second device or second service via the second proxy over an appropriate second non-overlay protocol, wherein the appropriate second non overlay protocol is dependent on the second device.

18. The apparatus of claim 17, wherein said processor is configured to query the device to obtain the meta-data.

19. The apparatus of claim 17, wherein said processor is configured to listen to advertisements from the device to obtain the meta-data.

20. The apparatus of claim 17, wherein said processor is configured to receive a request from a node to obtain data or services from the device, wherein the request is received through the overlay network.

21. The apparatus of claim 20, wherein said processor is configured to:
establish a direct connection with the node;
establish a connection with a selected device proxied by the node; and
provide the data or service to the node using the direct connection.

22. The apparatus of claim 21, wherein said processor is configured to translate selected data elements of the data.

23. The apparatus of claim 22, wherein the selected device is one of an IP device and a non IP device.

24. The apparatus of claim 17, wherein the device is one of an IP device and a non IP device.

25. A computer program product for operating a proxy in a peer-to-peer overlay network, the computer program product comprising:
a non-transitory computer-readable medium embodying codes executable to:
obtain meta-data associated with at least one of a device and a service, wherein said codes are configured to obtain the meta-data from the device using an appropriate first non overlay protocol such that the appropriate first non overlay protocol is dependent on the device;
generate a searchable index of the meta-data;
publish the searchable index on the overlay network as at least one of a distributed index and a centralized index;
communicate with a second proxy in the peer-to-peer overlay network; and
transmit meta-data associated with the device and the service to a second device or second service via the second proxy over an appropriate second non-overlay protocol, wherein the appropriate second non overlay protocol is dependent on the second device.

26. The computer-readable medium of claim 25, wherein said codes are configured to query the device to obtain the meta-data.

27. The computer-readable medium of claim 25, wherein said codes are configured to listen to advertisements from the device to obtain the meta-data.

28. The computer-readable medium of claim 25, wherein said codes are configured to receive a request from a node to obtain data or services from the device, wherein the request is received through the overlay network.

29. The computer-readable medium of claim 28, wherein said codes are configured to:
establish a direct connection with the node;
establish a connection with a selected device proxied by the node; and
provide the data or service to the node using the direct connection.

30. The computer-readable medium of claim 29, wherein said codes are configured to translate selected data elements of the data.

31. The computer-readable medium of claim 30, wherein the selected device is one of an IP device and a non IP device.

32. The computer-readable medium of claim 25, wherein the device is one of an IP device and a non IP device.

33. A method for operating a proxy in a peer-to-peer overlay network, the method comprising:
receiving a request from at least one of a device and a service using an appropriate first non overlay protocol, such that the appropriate first non overlay protocol is dependent on the device, to receive at least one of data and services from the overlay network;
searching an index of meta-data on the overlay network based on the request, wherein the index is at least one of a distributed index and a centralized index;
identifying a node associated with the at least one of data and services based on the index;
establishing a direct connection with the node;
communicating with a second proxy associated with the node using the direct communication;
obtaining the at least one of data and services from a second device or second service associated with the second proxy via an appropriate second non overlay protocol, wherein the appropriate second non overlay protocol is dependent on the second device; and
transmitting the at least one of data and services to the device using the appropriate first non overlay protocol.

34. The method of claim 33, wherein said establishing comprises sending an overlay request for the at least one of data and services to the node using the overlay network.

35. The method of claim 33, wherein said transmitting comprises translating the at least one of data and services to provide translation of data formats, modification of IP addresses, and uniqueness of service and data identifiers.

36. The method of claim 33, wherein the device is one of an IP device and a non IP device.

37. An apparatus for operating a proxy in a peer-to-peer overlay network, the apparatus comprising:
means for receiving a request from at least one of a device and a service using an appropriate first non overlay protocol, such that the appropriate first non overlay protocol is dependent on the device, to receive at least one of data and services from the overlay network;
means for searching an index of meta-data on the overlay network based on the request, wherein the index is at least one of a distributed index and a centralized index;
means for identifying a node associated with the at least one of data and services based on the index;
means for establishing a direct connection with the node;
means for communicating with a second proxy associated with the node using the direct communication;
means for obtaining the at least one of data and services from a second device or second service associated with the second proxy via an appropriate second non overlay protocol, wherein the appropriate second non overlay protocol is dependent on the second device; and
means for transmitting the at least one of data and services to the device using the appropriate first non overlay protocol.

38. The apparatus of claim 37, wherein said means for establishing comprises means for sending an overlay request for the at least one of data and services to the node using the overlay network.

39. The apparatus of claim 37, wherein said means for transmitting comprises means for translating the at least one of data and services to provide translation of data formats, modification of IP addresses, and uniqueness of service and data identifiers.

40. The apparatus of claim 37, wherein the device is one of an IP device and a non IP device.

41. An apparatus for operating a proxy in a peer-to-peer overlay network, the apparatus comprising:
- a transceiver configured to receive a request from at least one of a device and a service using an appropriate non overlay protocol, such that the appropriate non overlay protocol is dependent on the device, to receive at least one of data and services from the overlay network; and
- a processor configured to:
  - search an index of meta-data on the overlay network based on the request, wherein the index is at least one of a distributed index and a centralized index;
  - identify a node associated with the at least one of data and services based on the index;
  - establish a direct connection with the node;
  - communicate with a second proxy associated with the node using the direct communication; and
  - obtain the at least one of data and services from a second device or second service associated with the second proxy via an appropriate second non overlay protocol, wherein the appropriate second non overlay protocol is dependent on the second device;
- wherein said transceiver is further configured to transmit the at least one of data and services to the device using the appropriate non overlay protocol.

42. The apparatus of claim 41, wherein said processor is configured to send an overlay request for the at least one of data and services to the node using the overlay network.

43. The apparatus of claim 41, wherein said processor is configured to translate the at least one of data and services to provide translation of data formats, modification of IP addresses, and uniqueness of service and data identifiers.

44. The apparatus of claim 41, wherein the device is one of an IP device and a non IP device.

45. A computer program product for operating a proxy in a beer-to-peer overlay network, the computer program product comprising:
- a non-transitory computer-readable medium embodying codes executable to:
  - receive a request from at least one of a device and a service using an appropriate non overlay protocol, such that the appropriate non overlay protocol is dependent on the device, to receive at least one of data and services from the overlay network;
  - search an index of meta-data on the overlay network based on the request, wherein the index is at least one of a distributed index and a centralized index;
  - identify a node associated with the at least one of data and services based on the index;
  - establish a direct connection with the node;
  - communicate with a second proxy associated with the node using the direct communication;
  - obtain the at least one of data and services from a second device or second service associated with the second proxy via an appropriate second non overlay protocol, wherein the appropriate second non overlay protocol is dependent on the second device; and
  - transmit the at least one of data and services to the device using the appropriate non overlay protocol.

46. The computer-readable medium of claim 45, wherein said codes are configured to send an overlay request for the at least one of data and services to the node using the overlay network.

47. The computer-readable medium of claim 45, wherein said codes are configured to translate the at least one of data and services to provide translation of data formats, modification of IP addresses, and uniqueness of service and data identifiers.

48. The computer-readable medium of claim 45, wherein the device is one of an IP device and a non IP device.

* * * * *